United States Patent
Gaal et al.

(10) Patent No.: US 8,644,397 B2
(45) Date of Patent: Feb. 4, 2014

(54) EFFICIENT MULTIPLEXING OF REFERENCE SIGNAL AND DATA IN A WIRELESS COMMUNICATION SYSTEM

(75) Inventors: Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 12/564,619

(22) Filed: Sep. 22, 2009

(65) Prior Publication Data

US 2010/0074343 A1   Mar. 25, 2010

Related U.S. Application Data

(60) Provisional application No. 61/099,407, filed on Sep. 23, 2008.

(51) Int. Cl.
*H04L 27/00* (2006.01)

(52) U.S. Cl.
USPC ........................................................ 375/259

(58) Field of Classification Search
USPC .......... 375/259, 296, 299; 370/329, 210, 280, 370/335
See application file for complete search history.

(56) References Cited

U.S. PATENT DOCUMENTS

| | | | |
|---|---|---|---|
| 8,036,166 B2 * | 10/2011 | Tiirola et al. ................. | 370/329 |
| 2006/0034163 A1 | 2/2006 | Gore et al. | |
| 2006/0050799 A1 | 3/2006 | Hou et al. | |
| 2008/0165893 A1 | 7/2008 | Malladi et al. | |
| 2008/0298502 A1 * | 12/2008 | Xu et al. ....................... | 375/299 |
| 2010/0046480 A1 | 2/2010 | Kawamura et al. | |

FOREIGN PATENT DOCUMENTS

| | | |
|---|---|---|
| JP | 11145933 A | 5/1999 |
| JP | 2008136156 A | 6/2008 |
| WO | WO 2008057898 | 5/2008 |

OTHER PUBLICATIONS

ETRI: "Cyclic-Shift Hopping for Uplink Sounding Reference Signal" 3GPP TSG RAN WG1 Meeting No. 47-Bis, vol. R1-070213, Jan. 15, 2007, pp. 1-7, XP002482750.
International Search Report and Written Opinion—PCT/US2009/058100—ISA/EPO—Feb. 11, 2010.
Lu Feng et al., "CAZAC Sequence Hopping for Physical Uplink Control Channel of LTE", KDDI R&D Laboratories, IEEE, 2008, pp. 5.

(Continued)

*Primary Examiner* — Khai Tran
(74) *Attorney, Agent, or Firm* — Liem T. Do

(57) ABSTRACT

Techniques for transmitting reference signal and data using cyclic shifts of a base sequence are described. The base sequence may have good correlation properties, and different cyclic shifts of the base sequence may be orthogonal to one another. A user equipment (UE) may send at least one reference signal on assigned resources using at least one cyclic shift of the base sequence. The UE may send data on the assigned resources using at least one other cyclic shift of the base sequence. For each reference signal, the UE may modulate a cyclic shift of the base sequence with a known modulation symbol. For data, the UE may modulate each cyclic shift of the base sequence used for data with a data modulation symbol. Multiple UEs may share the same resources. Each UE may be assigned a different set of cyclic shifts among all cyclic shifts available for the resources.

45 Claims, 10 Drawing Sheets

(56) References Cited

OTHER PUBLICATIONS

NEC Group: "Definition of Cyclic Shift in Code Division Multiplexing" 3GPP Draft; R1-063202, 3rd Generation Partnership Project (3GPP), Mobile Competence Centre ; 650, Route Des Lucioles ; F-06921 Sophia-Antipolis Cedex ; France, vol. RAN WG1, No. Riga, Latvia; 20061102, Nov. 2, 2006, XP050103657 [retrieved on Nov. 2, 2006].

Taiwan Search Report—TW098132146—TIPO—Mar. 20, 2013.

* cited by examiner

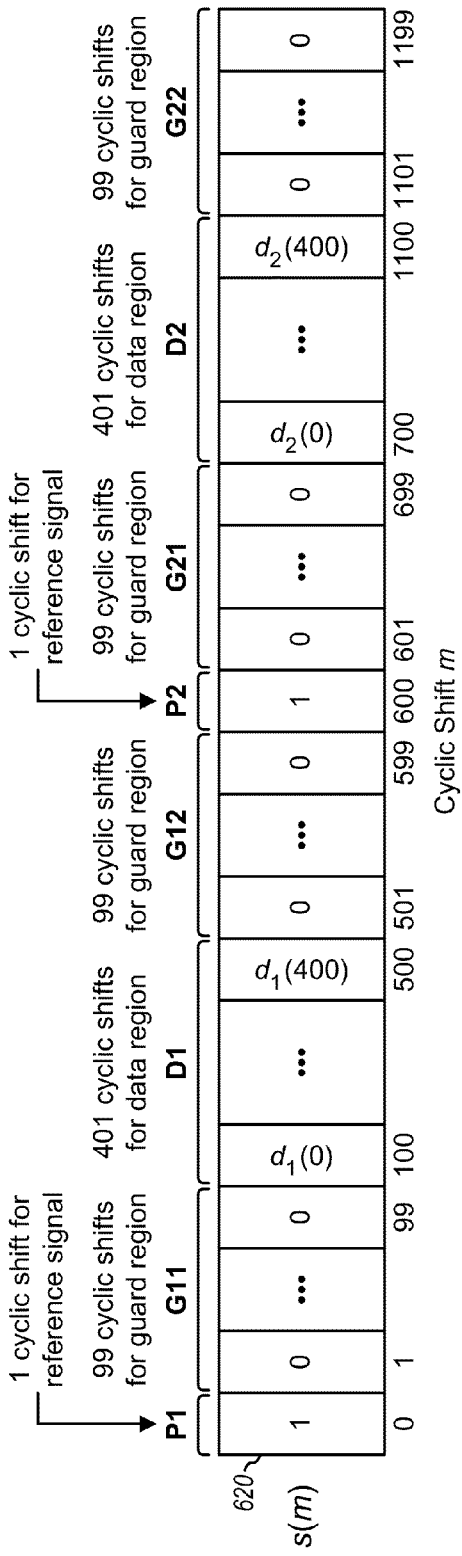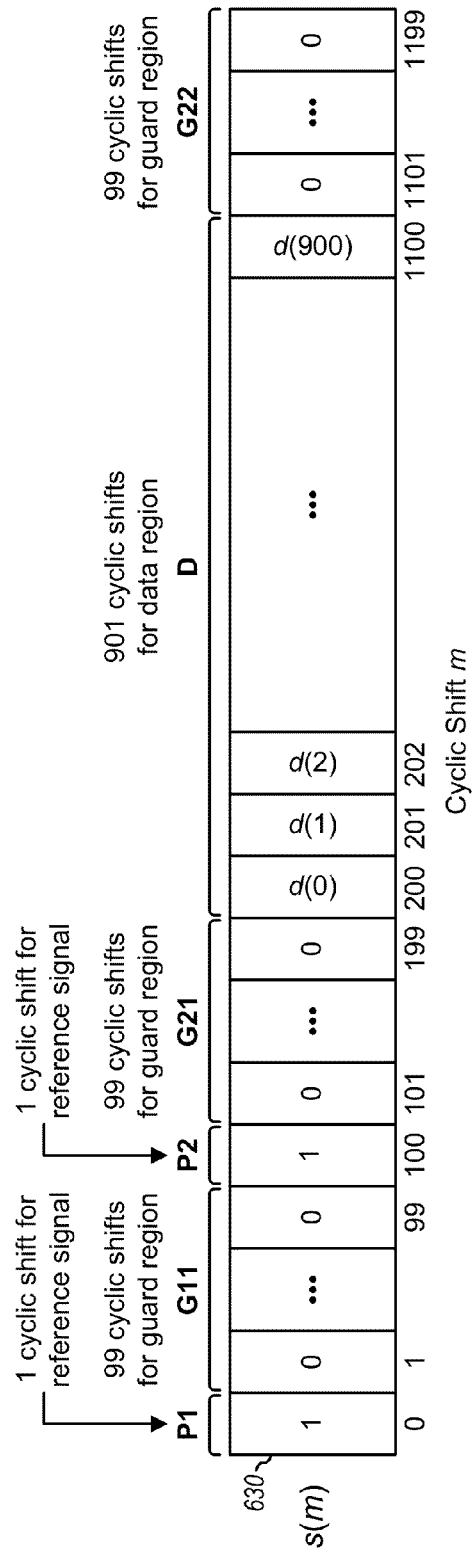
FIG. 6B
FIG. 6C

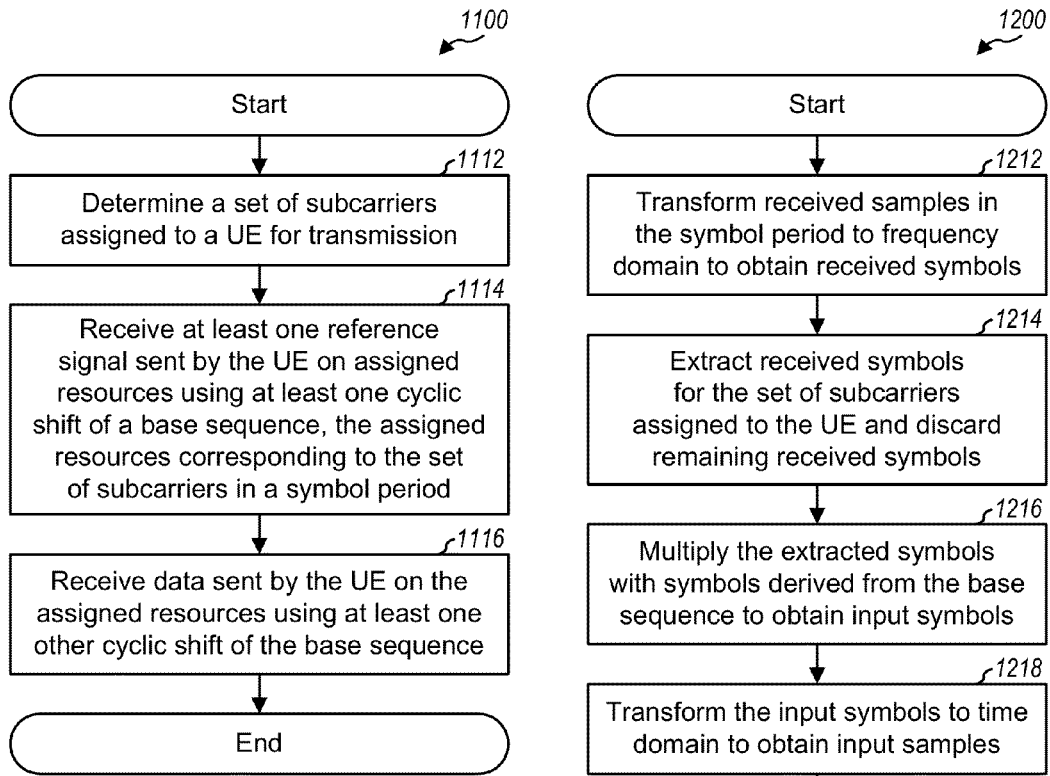
FIG. 11
FIG. 12
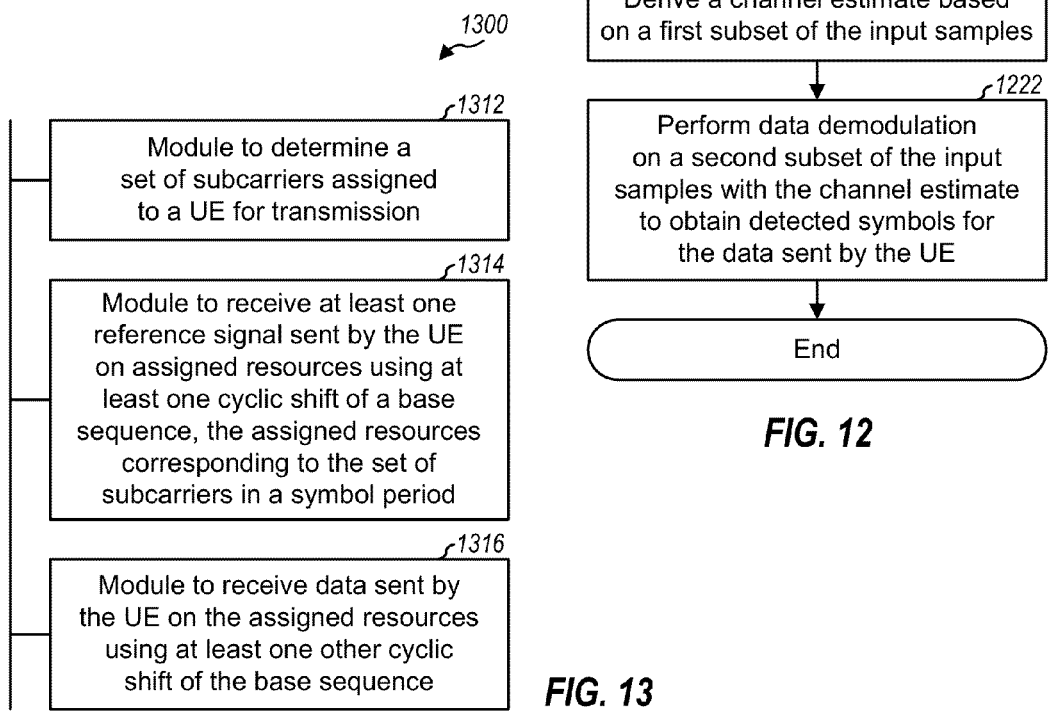
FIG. 13

EFFICIENT MULTIPLEXING OF REFERENCE SIGNAL AND DATA IN A WIRELESS COMMUNICATION SYSTEM

The present application claims priority to provisional U.S. Application Ser. No. 61/099,407, entitled "EFFICIENT MUTIPLEXING OF REFERENCE SIGNAL AND DATA IN THE LTE UPLINK," filed Sep. 23, 2008, assigned to the assignee hereof and incorporated herein by reference.

BACKGROUND

I. Field

The present disclosure relates generally to communication, and more specifically to techniques for transmitting reference signal and data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may transmit a reference signal and data to the base station. The reference signal may be used for channel estimation and/or other purposes. The reference signal may be useful but consumes resources to transmit. It may be desirable to transmit the reference signal and data as efficiently as possible in order to improve resource utilization.

SUMMARY

Techniques for transmitting reference signal and data using cyclic shifts of a base sequence are described herein. The base sequence may be selected to have good correlation properties. Different cyclic shifts of the base sequence may be orthogonal to one another and may be used to send reference signal and data on the same resources. The techniques may improve resource utilization while maintaining backward compatibility with UEs transmitting only reference signals.

In one design, a UE may determine a set of subcarriers assigned to the UE for transmission. The UE may send at least one reference signal on assigned resources using at least one cyclic shift of a base sequence. The assigned resources may correspond to the set of subcarriers in one symbol period. The UE may send data on the assigned resources using at least one other cyclic shift of the base sequence. The data may comprise traffic data, control data, some other data or information, or any combination thereof. The UE may send the at least one reference signal and data in various manners. In one design, the UE may send a single reference signal using a single cyclic shift of the base sequence. In another design, the UE may send multiple reference signals using multiple cyclic shifts of the base sequence, e.g., one reference signal for each transmit antenna at the UE. For each reference signal, the UE may modulate a cyclic shift of the base sequence with a known modulation symbol for the reference signal. The UE may send modulation symbols for data using other cyclic shifts of the base sequence. The UE may modulate each cyclic shift of the base sequence used for data with a data modulation symbol.

In one design, the at least one cyclic shift for the at least one reference signal may be separated from the at least one other cyclic shift for the data by at least one guard region. Each guard region may include one or more cyclic shifts. If the UE sends multiple reference signals, then the cyclic shifts for the reference signals may be separated from each other by one or more cyclic shifts. The guard regions may improve detection performance in the presence of delay spread in a wireless channel.

In one design, a single UE may send at least one reference signal and data on a set of subcarriers. In another design, multiple UEs may send reference signals and data on the same set of subcarriers. Each UE may be assigned a different set of cyclic shifts, which may be a subset of all cyclic shifts available for the set of subcarriers. Each UE may send at least one reference signal and possibly data using its assigned set of cyclic shifts.

Various aspects and features of the disclosure are described in further detail below.

BRIEF DESCRIPTION OF THE DRAWINGS

FIGS. 6A, 6B and 6C show three exemplary multiplexing formats.
FIGS. 11 and 13 show a process and an apparatus, respectively, for receiving reference signal and data.
FIG. 12 shows a process for demodulating cyclic shifts of a base sequence.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
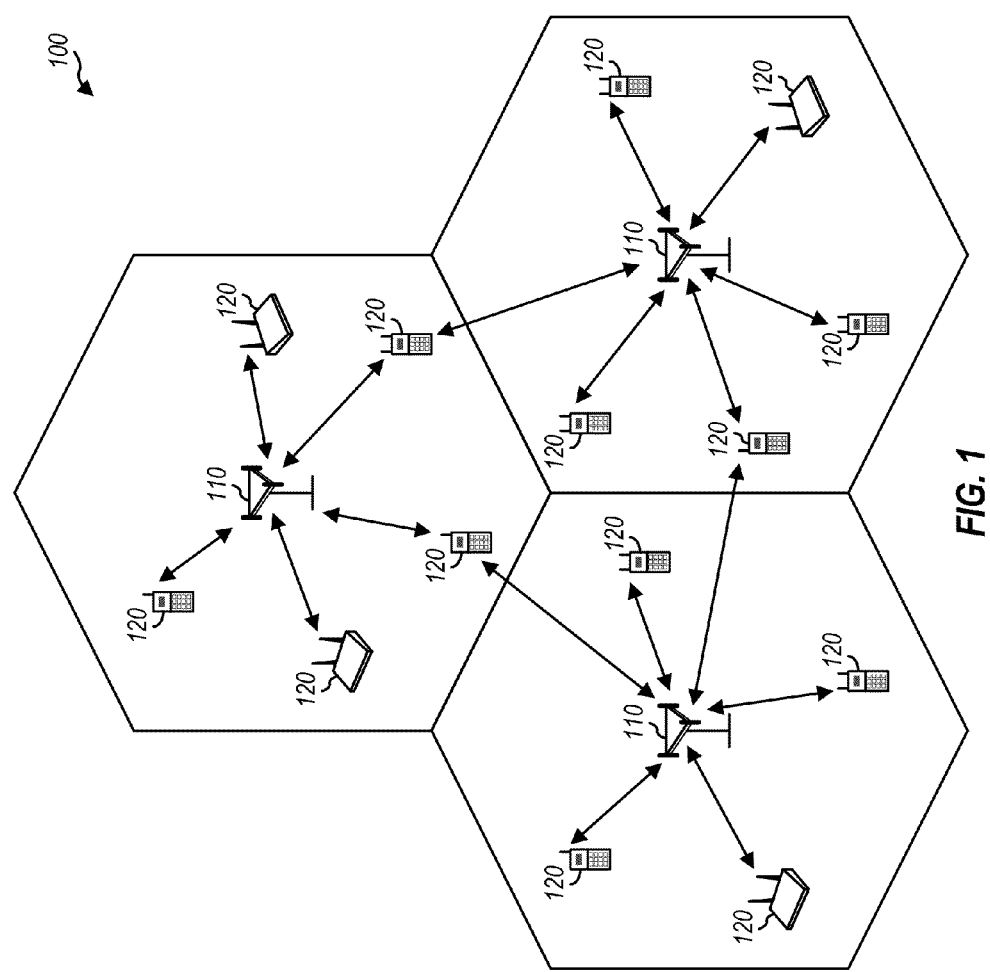
FIG. 1 shows a wireless communication system.

FIG. 1 shows a wireless communication system 100, which may be an LTE system or some other system. System 100 may include a number of evolved Node Bs (eNBs) 110 and other network entities. An eNB may be a station that communicates with the UEs and may also be referred to as a base station, a Node B, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. The system bandwidth may correspond to a subset of the $N_{FFT}$ total subcarriers, and the remaining subcarriers may be reserved for other systems or used as guard band between systems. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

Figure 2:
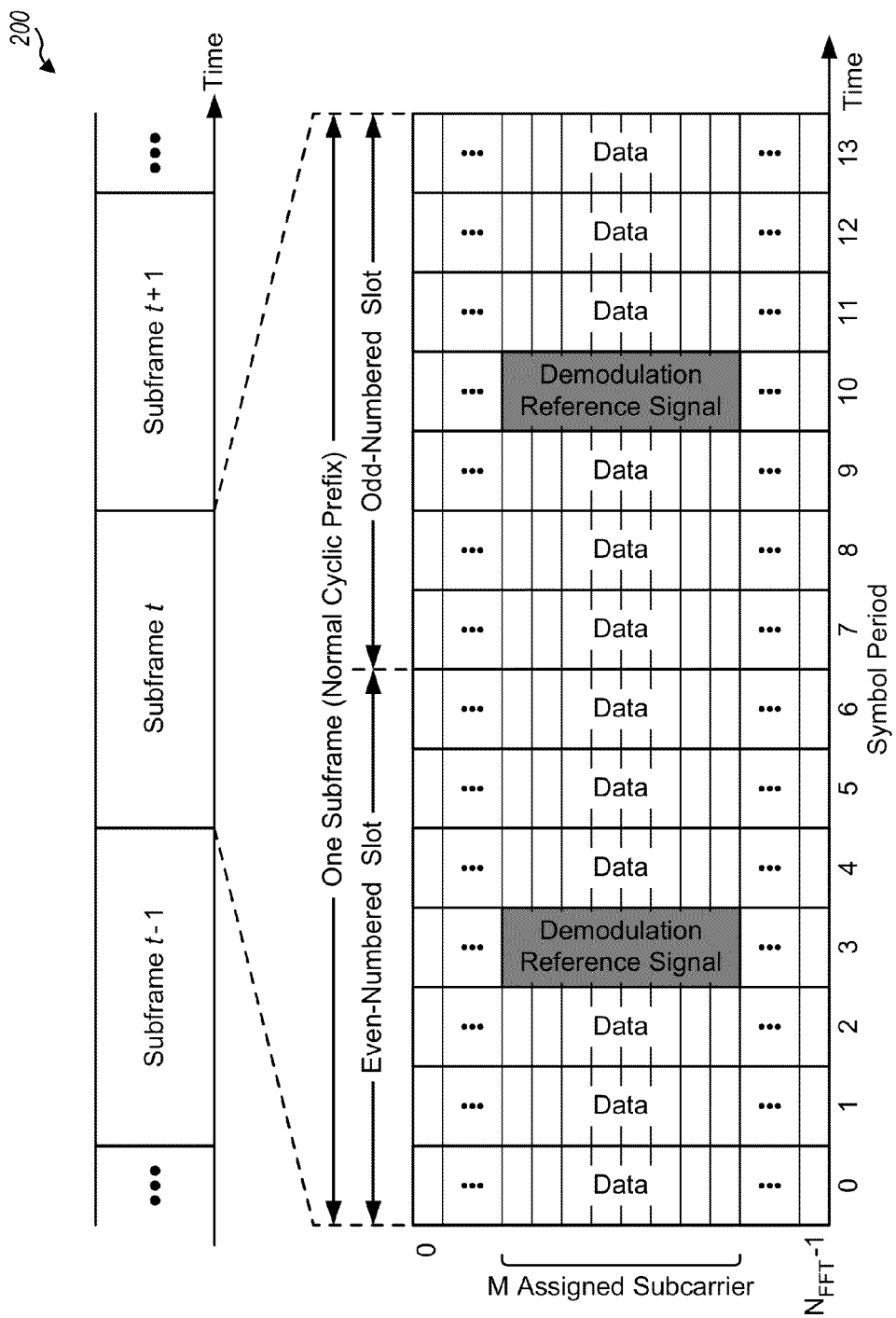
FIG. 2 shows an exemplary transmission structure.

FIG. 2 shows a transmission structure 200 that may be used for the uplink. The transmission timeline may be partitioned into units of subframes. Each subframe may have a predetermined duration, e.g., one millisecond (ms), and may be partitioned into two slots. Each slot may cover Q symbol periods, where Q may be dependent on the cyclic prefix length. For example, each slot may cover Q=6 symbol periods for an extended cyclic prefix (not shown in FIG. 2) or Q=7 symbol periods for a normal cyclic prefix (as shown in FIG. 2). A number of resource blocks may be defined in each slot. Each resource block may cover 12 subcarriers in one slot. The available resource blocks may be assigned to UEs for transmission.

FIG. 2 also shows an exemplary uplink transmission on a Physical Uplink Shared Channel (PUSCH) in two slots of one subframe. The two slots include 14 symbol periods with indices of 0 through 13 for the normal cyclic prefix. A UE may be assigned M subcarriers for transmission, where M may be an integer multiple of 12, which is the number of subcarriers for one resource block. An SC-FDMA symbol carrying data on the M assigned subcarriers may be sent in each symbol period except for symbol period 3 and 10. An SC-FDMA symbol carrying a demodulation reference signal (DM-RS) on the M assigned subcarriers may be sent in each of symbol periods 3 and 10. The demodulation reference signal may be used by an eNB for channel estimation and coherent demodulation of the SC-FDMA symbols carrying data. The demodulation reference signal may also be referred to as a reference signal, pilot, preamble, reference, training sequence, etc.

For the extended cyclic prefix, the two slots in one subframe include 12 symbol periods with indices of 0 through 11. An SC-FDMA symbol carrying data on M assigned subcarriers may be sent in each symbol period except for symbol periods 2 and 8. An SC-FDMA symbol carrying a demodulation reference signal on the M assigned subcarriers may be sent in each of symbol periods 2 and 8.

As shown in FIG. 2, a demodulation reference signal may be sent in each slot and may occupy an entire SC-FDMA symbol. The demodulation reference signal may account for 14% overhead with the normal cyclic prefix and 17% overhead with the extended cyclic prefix. It may be desirable to reduce the overhead due to the demodulation reference signal.

In an aspect, demodulation reference signal and data may be sent concurrently using different cyclic shifts of a base sequence. The demodulation reference signal and data may be sent in a manner to maintain backward compatibility. For example, a demodulation reference signal sent with data may be generated in the same way as a demodulation reference signal sent without any data. Furthermore, a UE sending a demodulation reference signal with data may be multiplexed with another UE sending only a demodulation reference signal on the same set of subcarriers. The multiplexing of the demodulation reference signal and data may be flexibly performed based on a tradeoff between reference overhead, channel estimation performance, and data throughput.

A demodulation reference signal may be generated with a base sequence having good correlation properties. The base sequence may be a CAZAC (constant amplitude zero auto correlation) sequence having a flat spectral response zero auto-correlation. Zero auto-correlation means that the correlation of the CAZAC sequence with itself would result in a large value at zero offset and small (or zero) values at all other offsets. The zero auto-correlation property is beneficial for accurate detection of the CAZAC sequence. Some exemplary CAZAC sequences include a Zadoff-Chu sequence, a Chu sequence, a Frank sequence, a generalized chirp-like (GCL) sequence, etc.

A frequency-domain base sequence of length M may be denoted as R(k). This base sequence may be transformed to the time domain with an M-point inverse discrete Fourier transform (IDFT) to obtain a time-domain base sequence of length M, which may be denoted as r(n). For clarity, in much of the description below, frequency-domain sequences are denoted with capital letter and subcarrier index k (e.g., R(k)), and time-domain sequences are denoted with lower case letter and sample index n.

M frequency-domain orthogonal sequences may be generated by cyclically shifting the frequency-domain base sequence R(k) by different amounts, as follows:

$$R_m(k)=e^{j2\pi \cdot m \cdot k/M}R(k), \text{ for } m=0, \ldots, M-1, \qquad \text{Eq}(1)$$

where $R_m(k)$ is a frequency-domain orthogonal sequence with a cyclic shift of m. As shown in equation (1), the base sequence R(k) may be cyclically shifted in the frequency domain by applying phase ramps of different slopes to obtain different frequency-domain orthogonal sequences.

A frequency-domain orthogonal sequence is a frequency domain representation of a time-domain orthogonal sequence. In the case of CAZAC sequences, a frequency-domain orthogonal sequence also has good auto-correlation in the frequency domain. However, this property may not hold in general for all sequences with good time-domain auto-correlation.

Equivalently, M time-domain orthogonal sequences may be generated by cyclically shifting the time-domain base sequence r(n) by different amounts, as follows:

$$r_m(n)=r((n+m) \bmod M), \text{ for } m=0, \ldots, M-1, \quad \text{Eq(2)}$$

where $r_m(n)$ is a time-domain orthogonal sequence with a cyclic shift of m, and "mod" denotes a modulo operation. Time-domain orthogonal sequence $r_m(n)$ is the IDFT of the corresponding frequency-domain orthogonal sequence $R_m(k)$, for m=0, ..., M−1.

Figure 3:
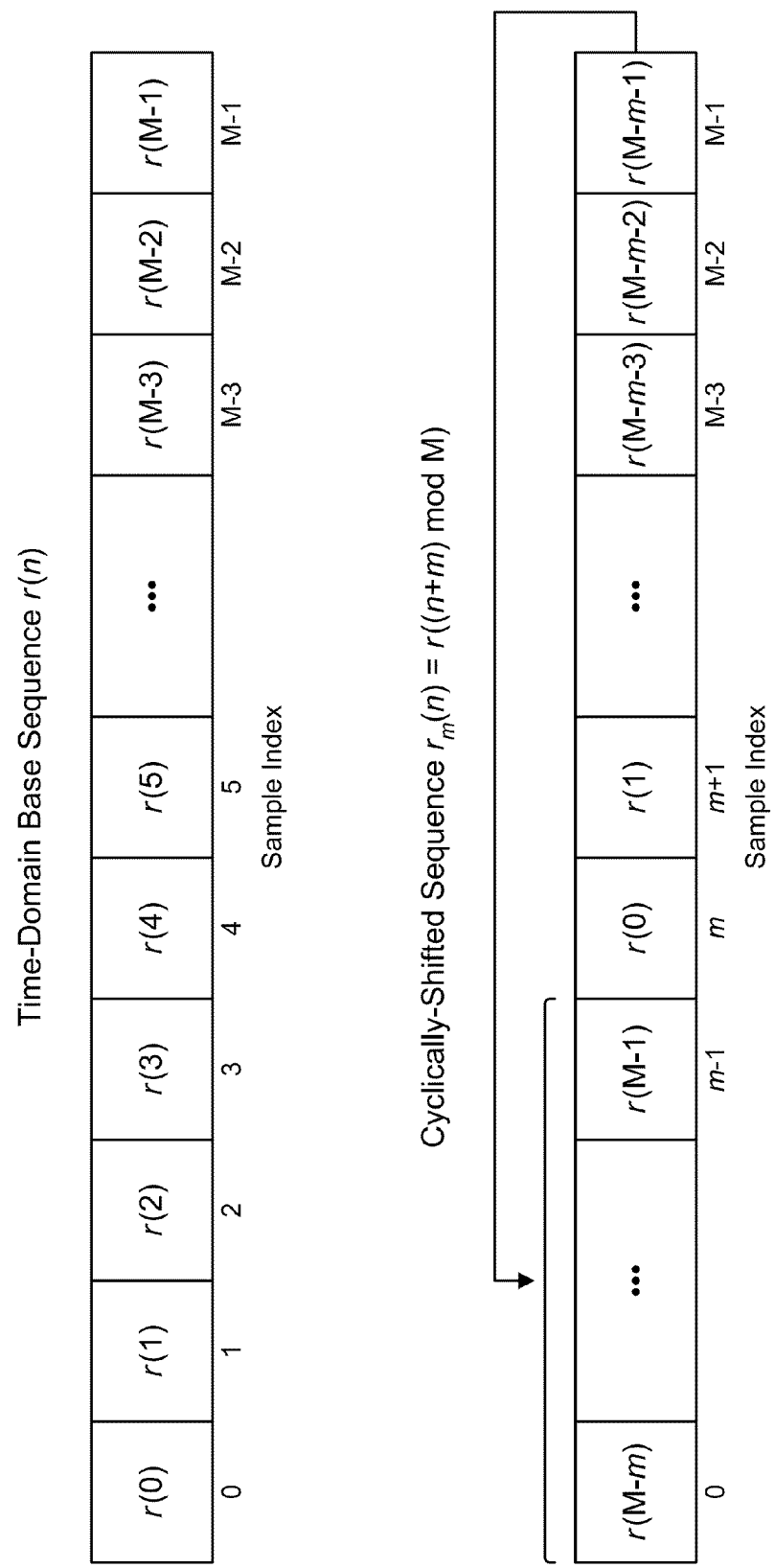
FIG. 3 shows a base sequence and a cyclic shift of the base sequence.

FIG. 3 shows the time-domain base sequence r(n) and the time-domain orthogonal sequence $r_m(n)$. The base sequence r(n) includes M samples r(0) through r(M−1) for sample indices 0 through M−1, respectively. The orthogonal sequence $r_m(n)$ also includes the same M samples r(0) through r(M−1), which are cyclically shifted by m samples, as shown in FIG. 3. Sequences r(n) and $r_m(n)$ are mutually orthogonal.

Due to the CAZAC properties of the base sequence r(n), all cyclic shifts of the base sequence are orthogonal to each other. Thus, orthogonal sequences $r_i(n)$ and $r_j(n)$ would be orthogonal to one another for any i and any j where i≠j. The orthogonal sequences may be used to transmit demodulation reference signal and data, as described above.

Figure 4:
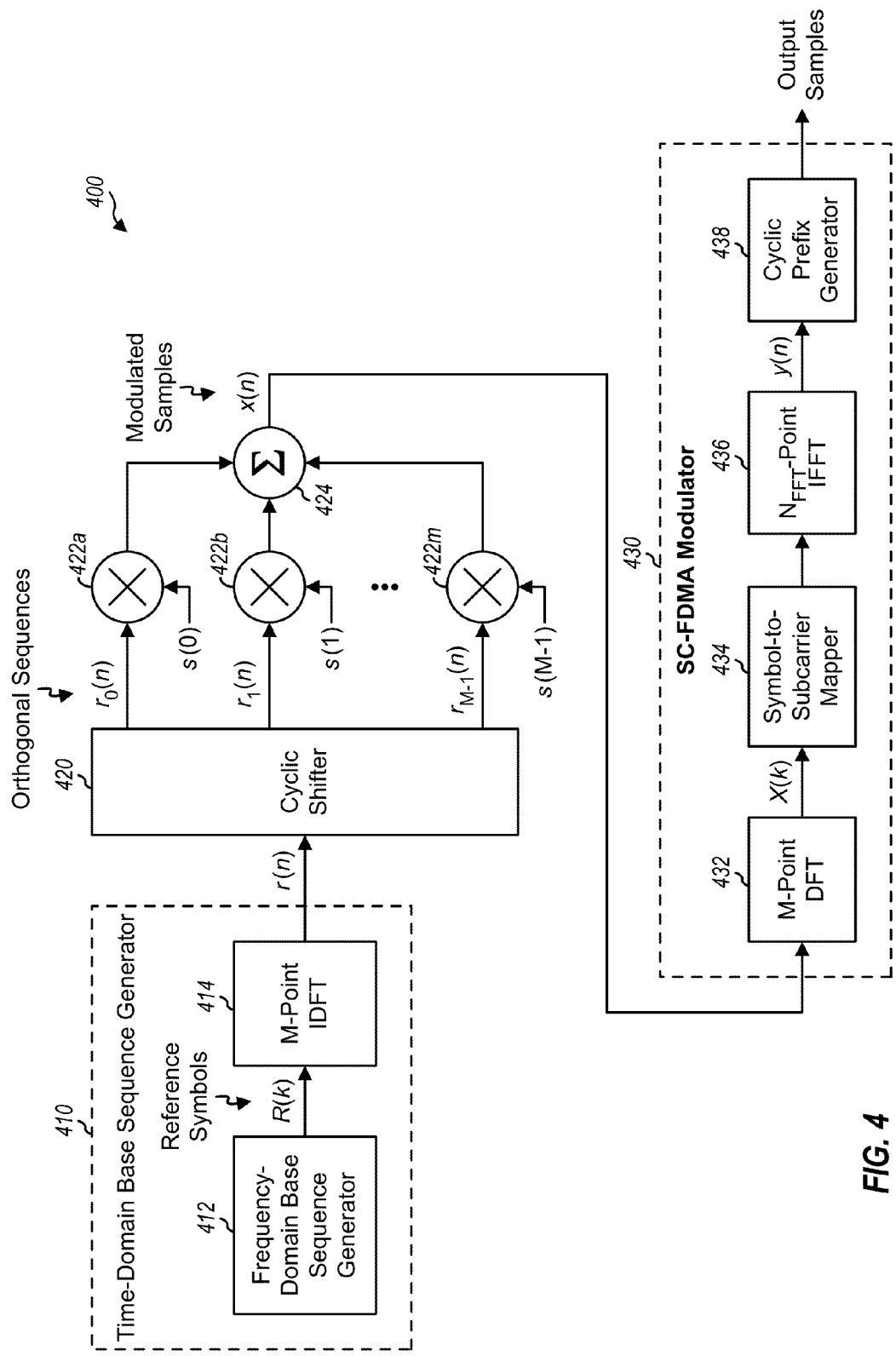
FIGS. 4 and 5 show two designs of a transmitter.

FIG. 4 shows a block diagram of a design of a transmitter 400, which may be capable of transmitting demodulation reference signal and data on the same resources. Within transmitter 400, a base sequence generator 410 may generate a time-domain base sequence r(n) of length M. Within generator 410, a base sequence generator 412 may generate a frequency-domain base sequence R(k) comprising M reference symbols, e.g., based on a Zadoff-Chu sequence or some other sequence having good correlation properties. An IDFT unit 414 may receive the base sequence R(k) from generator 412, perform an M-point IDFT on the M reference symbols in the base sequence, and provide the time-domain base sequence r(n) comprising M samples.

A cyclic shifter 420 may receive the time-domain base sequence r(n) and may generate M orthogonal sequences $r_0(n)$ through $r_{M-1}(n)$ of length M, e.g., as shown in equation (2). Cyclic shifter 420 may provide the M orthogonal sequences $r_0(n)$ through $r_{M-1}(n)$ to M multiplier 422a through 422m, respectively. Multiplier 422a through 422m may also receive M modulation symbols s(0) through s(M−1), respectively. In general, a modulation symbol may be a real or complex value and may be zero or non-zero. A modulation symbol for data may be referred to as a data modulation symbol. Modulation symbols s(0) through s(M−1) may each be a known modulation symbol for a reference signal, a data modulation symbol, or a zero value. Each multiplier 422 may multiply each sample in its orthogonal sequence $r_m(n)$ with its modulation symbol s(m). Each multiplier 422 may provide a demodulation reference sequence, a data sequence, or a sequence of zeros. An accumulator 424 may sum the samples from multipliers 422a through 422m in each sample period to obtain modulated samples x(n), which may be expressed as:

$$x(n) = \sum_{m=0}^{M-1} r_m(n) \cdot s(m), \quad \text{Eq (3)}$$

for n = 0, ... , M − 1.

Accumulator 424 may provide M modulated samples in one SC-FDMA symbol period, which may be referred to as simply a symbol period.

An SC-FDMA modulator 430 may generate an SC-FDMA symbol with the M modulated samples from accumulator 424. Within SC-FDMA modulator 430, a discrete Fourier transform (DFT) unit 432 may perform an M-point DFT on the M modulated samples and provide M modulated symbols. A symbol-to-subcarrier mapper 434 may map the M modulated symbols to M subcarriers assigned for transmission, map zero symbols with signal value of zero to the remaining subcarriers, and provide $N_{FFT}$ mapped symbols for the $N_{FFT}$ total subcarriers. An inverse fast Fourier transform (IFFT) unit 436 may perform an $N_{FFT}$-point IFFT on the $N_{FFT}$ mapped symbols and provide $N_{FFT}$ time-domain output samples y(n). A cyclic prefix generator 438 may copy the last $N_{CP}$ samples of the $N_{FFT}$ output samples, append these $N_{CP}$ samples to the front of the $N_{FFT}$ output samples, and provide an SC-FDMA symbol comprising $N_{FFT}+N_{CP}$ output samples. Each output sample may be a complex value to be transmitted in one sample period. The cyclic prefix may be used to combat inter-symbol interference (ISI) caused by frequency selective fading.

Figure 5:
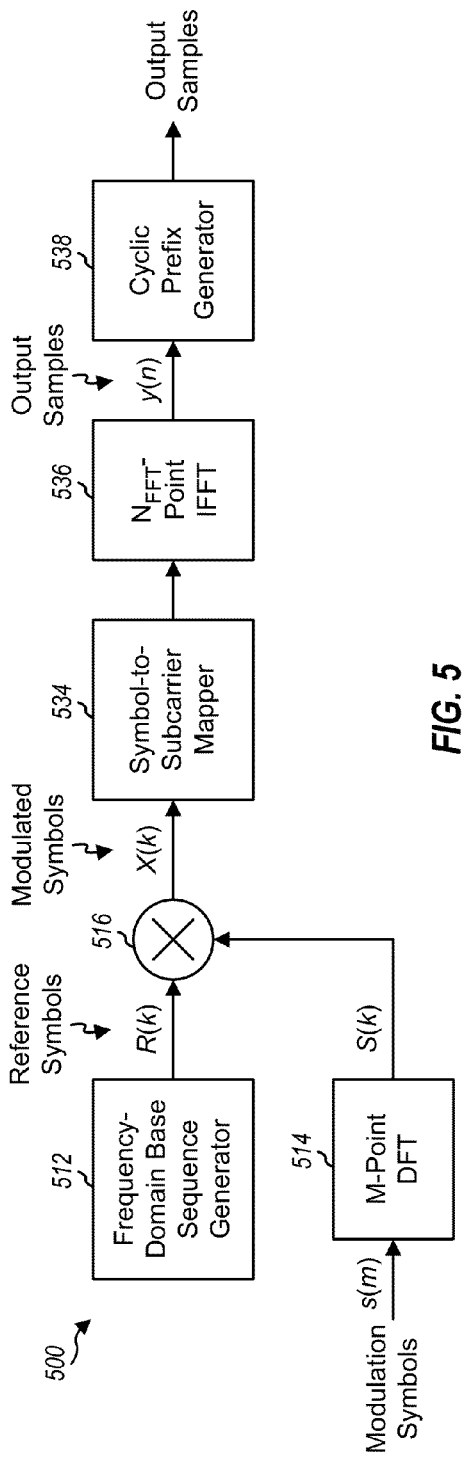

FIG. 5 shows a block diagram of a design of a transmitter 500, which may also be capable of transmitting demodulation reference signal and data on the same resources. Within transmitter 500, a base sequence generator 512 may generate a frequency-domain base sequence R(k) of length M, e.g., based on a Zadoff-Chu sequence or some other sequence having good correlation properties. A DFT unit 514 may receive M modulation symbols s(m), for m=0, ..., M−1, to be sent with M orthogonal sequences, perform an M-point DFT on the M modulation symbols, and provide M frequency-domain symbols S(k), for k=0, ..., M−1. A multiplier 516 may multiply the reference symbols R(k) in the base sequence with the frequency-domain symbols S(k), symbol-by-symbol, and may provide M modulated symbols X(k), where X(k)=R(k)·S(k).

A symbol-to-subcarrier mapper 534 may map the M modulated symbols to M subcarriers assigned for transmission, map zero symbols to the remaining subcarriers, and provide $N_{FFT}$ mapped symbols for the $N_{FFT}$ total subcarriers. An IFFT unit 536 may perform an $N_{FFT}$-point IFFT on the $N_{FFT}$ mapped symbols and provide $N_{FFT}$ time-domain output samples. A cyclic prefix generator 538 may append a cyclic prefix to the $N_{FFT}$ output samples and provide an SC-FDMA symbol comprising $N_{FFT}+N_{CP}$ output samples.

FIGS. 4 and 5 show two exemplary designs of a transmitter that can transmit demodulation reference signal and data with orthogonal sequences of different cyclic shifts. The orthogonal sequences may be generated and modulated in other manners.

In general, the M orthogonal sequences $r_0(n)$ through $r_{M-1}(n)$ may be used to send one or more demodulation reference signals, data, and/or other information. In one design, orthogonal sequence $r_0(n)$ may be used for a demodulation reference signal, and the remaining M−1 orthogonal sequences $r_1(n)$ through $r_{M-1}(n)$ may be used to send up to M−1 data modulation symbols. Orthogonal sequence $r_0(n)$ may be scaled with a gain of $g_{RS}$ for the demodulation reference signal, e.g., s(0)=$g_{RS}$. The transmit power of the demodulation reference signal may be scaled (e.g., higher) relative to the transmit power of data signals by selecting a suitable value for $g_{RS}$. Each remaining orthogonal sequence $r_m(n)$ may be modulated with a data modulation symbol s(m) to obtain a corresponding data signal $x_m(n)$. Up to M−1 data modulation symbols may be sent with up to M−1 orthogonal sequences of different cyclic shifts.

The M orthogonal sequences $r_0(n)$ through $r_{M-1}(n)$ should be orthogonal to one another due to the CAZAC properties of the base sequence. However, the orthogonality may be compromised due to delay spread in a wireless channel. Delay spread is the difference between the earliest and latest arriving signal instances at a receiver for a signal transmitted by a transmitter. Delay spread may cause an orthogonal sequence to smear across time. Orthogonal sequences with cyclic shifts separated by less than the delay spread may have higher cross-correlation results, which may adversely impact detection performance.

To combat loss of orthogonality due to delay spread, an orthogonal sequence used for a demodulation reference signal may be separated from orthogonal sequences used for data by guard regions. Each guard region may include a range of cyclic shifts that are not used to in order to avoid degrading the demodulation reference signal.

Figure 6A:
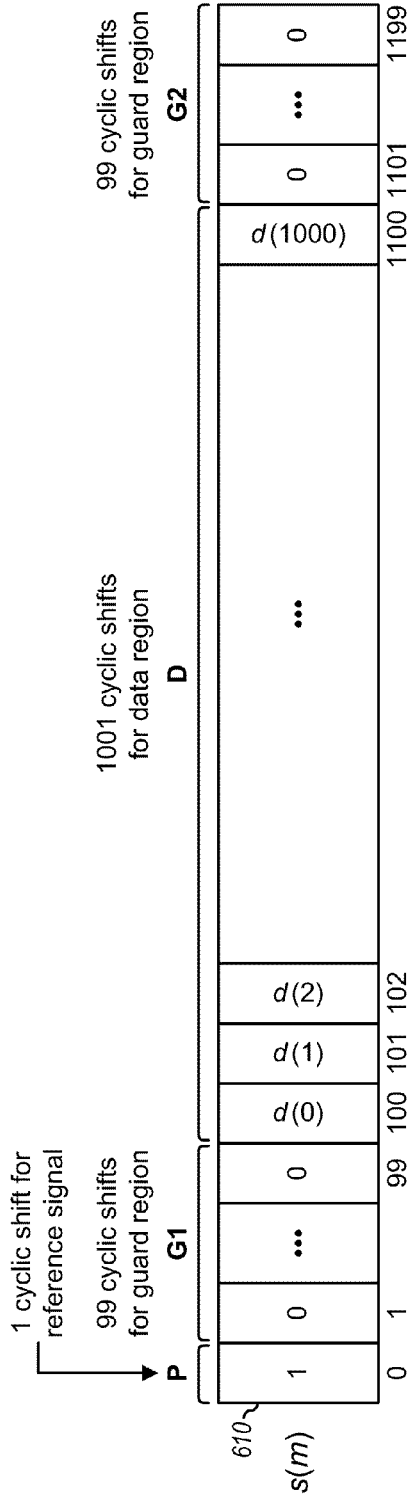

FIG. 6A shows a design of multiplexing a demodulation reference signal and data for one UE. For clarity, FIG. 6A shows an example in which M=1200 subcarriers are assigned to the UE, and $N_{FFT}$=2048 total subcarriers are available for 20 MHz bandwidth. The 1200 possible cyclic shifts are assigned indices of 0 through 1199. In the example shown in FIG. 6A, a block of one cyclic shift m=0 is used for a demodulation reference signal and is denoted as "P". A block of 99 cyclic shifts m=1 through 99 is used for a first guard region and is denoted as "G1". A block of 1001 cyclic shifts m=100 through 1100 is used for data and is denoted as "D". A block of 99 cyclic shifts m=1101 through 1199 is used for a second guard region and is denoted as "G2".

A box 610 shows 1200 modulation symbols for 1200 orthogonal sequences of different cyclic shifts. The orthogonal sequence with a cyclic shift of zero may be modulated with a value of 1 (or $g_{RS}$) to obtain the demodulation reference signal. The next 99 cyclic shifts may be unused, and their orthogonal sequences may each be modulated with 0. The next 1001 cyclic shifts may be used for data, and their orthogonal sequences may be modulated with 1001 data modulation symbols d(0) through d(1000). Each data modulation symbol may be a QPSK symbol, a 16-QAM symbol, a 64-QAM symbol, etc. The last 99 cyclic shifts may be unused, and their orthogonal sequences may each be modulated with 0.

As shown in FIG. 6A, a data modulation symbol may be sent for each cyclic shift in the data region D. Data modulation symbols may also be sent in a subset of the cyclic shifts in the data region. In this case, the data modulation symbols may be spaced apart as evenly as possible among the cyclic shifts in the data region. For example, 101 data modulation symbols may be sent with cyclic shifts 100, 110, 120, . . . , and 1100, which may be spaced apart by 10 cyclic shifts. This may reduce interference among the data sequences.

The guard regions G1 and G2 may protect the demodulation reference signal from the data sequences, and vice versa. The guard regions G1 and G2 may each be longer than the delay spread in order to combat loss of orthogonality due to delay spread. The guard regions G1 and G2 may have equal length or different lengths. In a causal system, the first guard region G1 may be omitted or reduced if some degradation on the data sequences due to the demodulation reference signal is acceptable.

The system may support spatial division multiple access (SDMA). For SDMA on the uplink, multiple UEs may simultaneously send demodulation reference signals and data to an eNB on shared resources. The eNB may perform receiver processing to recover the demodulation reference signals and data sent simultaneously by the multiple UEs. These UEs may be selected due to their spatial compatibility and may be more easily separated by the eNB.

For SDMA, the multiple UEs may be assigned the same resource blocks covering M subcarriers. M cyclic shifts of the base sequence may be available for assignment to the UEs. Each UE may be assigned a different set of cyclic shifts that may include cyclic shifts not assigned to any other UE sharing the resource blocks. Each UE may send demodulation reference signal and data using its assigned set of cyclic shifts.

FIG. 6B shows a design of multiplexing demodulation reference signals and data for two UEs with SDMA. For clarity, FIG. 6B shows an example in which M=1200 subcarriers are assigned to the two UEs, and the 1200 possible cyclic shifts are assigned indices of 0 through 1199. The first UE is assigned the first 600 cyclic shifts 0 through 599, and the second UE is assigned the last 600 cyclic shifts 600 through 1199.

In the example shown in FIG. 6B, for the first UE, a block ("P1") of one cyclic shift m=0 is used for a demodulation reference signal, a block ("G11") of 99 cyclic shifts m=1 through 99 is used for a first guard region, a block ("D1") of 401 cyclic shifts m=100 through 500 is used for data, and a block ("G12") of 99 cyclic shifts m=501 through 599 is used for a second guard region. For the second UE, a block ("P2") of one cyclic shift m=600 is used for a demodulation reference signal, a block ("G21") of 99 cyclic shifts m=601 through 699 is used for a first guard region, a block ("D2") of 401 cyclic shifts m=700 through 1100 is used for data, and a block ("G22") of 99 cyclic shifts m=1101 through 1199 is used for a second guard region.

A box 620 shows 1200 modulation symbols for 1200 orthogonal sequences of different cyclic shifts. Two orthogonal sequences with cyclic shifts of 0 and 600 may each be modulated with a value of 1 (or $g_{RS}$) to obtain a demodulation reference signal. The 401 orthogonal sequences with cyclic shifts 100 through 500 may be modulated with 401 data modulation symbols $d_1(0)$ through $d_1(400)$ for the first UE. The 401 orthogonal sequences with cyclic shifts 700 through 1100 may be modulated with 401 data modulation symbols $d_2(0)$ through $d_2(400)$ for the second UE. The remaining cyclic shifts may be unused, and their orthogonal sequences may each be modulated with 0.

FIG. 6C shows another design of multiplexing demodulation reference signals and data for two UE with SDMA. In this example, two UEs are assigned M=1200 subcarriers, the first UE transmits only a demodulation reference signal, and the second UE transmits a demodulation reference signal and data. In the example shown in FIG. 6C, for the first UE, a block ("P1") of one cyclic shift m=0 is used for a demodulation reference signal, and a block ("G11") of 99 cyclic shifts m=1 through 99 is used for a guard region. For the second UE, a block ("P2") of one cyclic shift m=100 is used for a demodulation reference signal, a block ("G21") of 99 cyclic shifts m=101 through 199 is used for a first guard region, a block ("D") of 901 cyclic shifts m=200 through 1100 is used for data, and a block ("G22") of 99 cyclic shifts m=1101 through 1199 is used for a second guard region. A box 630 shows 1200 modulation symbol for 1200 orthogonal sequences of different cyclic shifts.

FIG. 6C also shows another design of multiplexing demodulation reference signals and data for two UEs with SDMA, where the two UEs may transmit data using the same or different sets of cyclic shifts. In the example shown in FIG. 6C, the two UEs are assigned M=1200 subcarriers, and both UEs transmit a demodulation reference signal and data on the 1200 assigned subcarriers. For the first UE, a block ("P1") of one cyclic shift m=0 is used for a demodulation reference signal, and a block ("G11") of 99 cyclic shifts m=1 through 99 is used for a first guard region. For the second UE, a block ("P2") of one cyclic shift m=100 is used for a demodulation reference signal, and a block ("G21") of 99 cyclic shifts m=101 through 199 is used for a second guard region. For both UEs, a block ("D") of 901 cyclic shifts m=200 through 1100 is used for data, and a block ("G22") of 99 cyclic shifts m=1101 through 1199 is used for a third guard region. The data region D may be fully allocated to both UEs with a complete overlap. Alternatively, the data region D may be unequally allocated to the two UEs with or without a partial overlap. Overlap means that a cyclic shift is allocated to both UEs, complete overlap means that the two UEs are allocated the same set of cyclic shifts, and partial overlap means that the two UEs are allocated different sets of cyclic shifts, with one or more cyclic shifts being allocated to both UEs. When there is an overlap, the eNB may use receiver spatial processing techniques to recover the individual data sent by the two UEs. Box 630 shows 1200 modulation symbol for 1200 orthogonal sequences of different cyclic shifts. Although not shown in FIG. 6C, in the data region, two modulation symbols $d_1(m)$ and $d_2(m)$ may be sent by the two UEs for each cyclic shift m that is allocated to both UEs.

The system may support multiple-input single-output (MISO) and/or multiple-input multiple-output (MIMO) transmission on the uplink. For MISO or MIMO on the uplink, a UE may transmit multiple demodulation reference signals from multiple transmit antennas at the UE, e.g., one demodulation reference signal from each antenna. The UE may also simultaneously transmit data with the demodulation reference signals. The eNB may be able to derive a channel estimate for each transmit antenna at the UE based on the demodulation reference signal transmitted from that antenna. The eNB may recover the data sent by the UE based on the channel estimates for all transmit antennas.

FIG. 6C shows a design of multiplexing demodulation references signals and data for a single UE with MISO or MIMO on the uplink. In this example, the UE transmits two demodulation reference signals and data on M=1200 subcarriers assigned to the UE. In the example shown in FIG. 6C, a block ("P1") of one cyclic shift m=0 is used for a first demodulation reference signal for a first transmit antenna, a block ("G11") of 99 cyclic shifts m=1 through 99 is used for a first guard region, a block ("P2") of one cyclic shift m=100 is used for a second demodulation reference signal for a second transmit antenna, a block ("G21") of 99 cyclic shifts m=101 through 199 is used for a second guard region, a block ("D") of 901 cyclic shifts m=200 through 1100 is used for data, and a block ("G22") of 99 cyclic shifts m=1101 through 1199 is used for a third guard region. Box 630 shows 1200 modulation symbols for 1200 orthogonal sequences of different cyclic shifts.

FIGS. 6A, 6B and 6C show three exemplary multiplexing formats that may be used to multiplex one or more demodulation reference signals and data on the same set of subcarriers. FIGS. 6A, 6B and 6C also show a specific combination of regions for each multiplexing format and a specific size for each region. The multiplexing format in FIG. 6A may be used for one UE, and the multiplexing format in FIGS. 6B and 6C may be used for one or two UEs. Other multiplexing formats may also be defined. For example, multiplexing formats supporting more than two demodulation reference signals for one or more UEs may be defined. Multiplexing formats supporting more than two UEs may also be defined.

In general, the available cyclic shifts may be partitioned into one or more sets, and each set of cyclic shifts may be assigned to a different UE. Each UE may be assigned any number of cyclic shifts. The set of cyclic shifts for each UE may be partitioned into any number of regions for demodulation reference signal, data, and guard. Each region may have any suitable size. The guard region between two UEs (e.g., guard regions G12 and G22 in FIG. 6B) may be selected to be longer than the delay spread plus expected timing error between the two UEs. The guard region between different transmissions from the same UE (e.g., guard regions G1 and G2 in FIG. 6A, and guard regions G11 and G21 in FIG. 6B) may be selected to be longer than the delay spread. The size of each guard region may be given by a particular percentage of the number of assigned subcarriers, i.e., by a particular percentage of M. For the example shown in FIG. 6A, each guard region may cover 99 cyclic shifts for an assignment of 1200 subcarriers, 49 cyclic shifts for an assignment of 600 subcarriers, 24 cyclic shifts for an assignment of 300 subcarriers, etc. Similarly, the size of each data region may scale with the number of assigned subcarriers.

Parameters for multiplexing demodulation reference signal and data may be conveyed to a UE in various manners. In one design, an eNB may send signaling to convey a multiplexing format selected for use and/or parameters for regions in the selected multiplexing format. For the multiplexing format shown in FIG. 6A, the eNB may convey the sizes of the guard regions G1 and G2 and/or the size of the data region D. The sizes of the guard regions G1 and G2 may also be broadcast to all UEs or may be tied to other parameters such as the cyclic prefix length ($N_{CP}$). For SDMA, the eNB may also convey the starting cyclic shift and the number of cyclic shifts assigned to the UE. In another design, a set of multiplexing configurations may be defined, e.g., in the LTE standard. Each multiplexing configuration may be associated a specific multiplexing format as well as a specific size for each region defined by the multiplexing format. The eNB may select a multiplexing configuration for use and may send an index of the selected configuration to the UE. The eNB may also convey the parameters for multiplexing in other manners.

Figure 7:
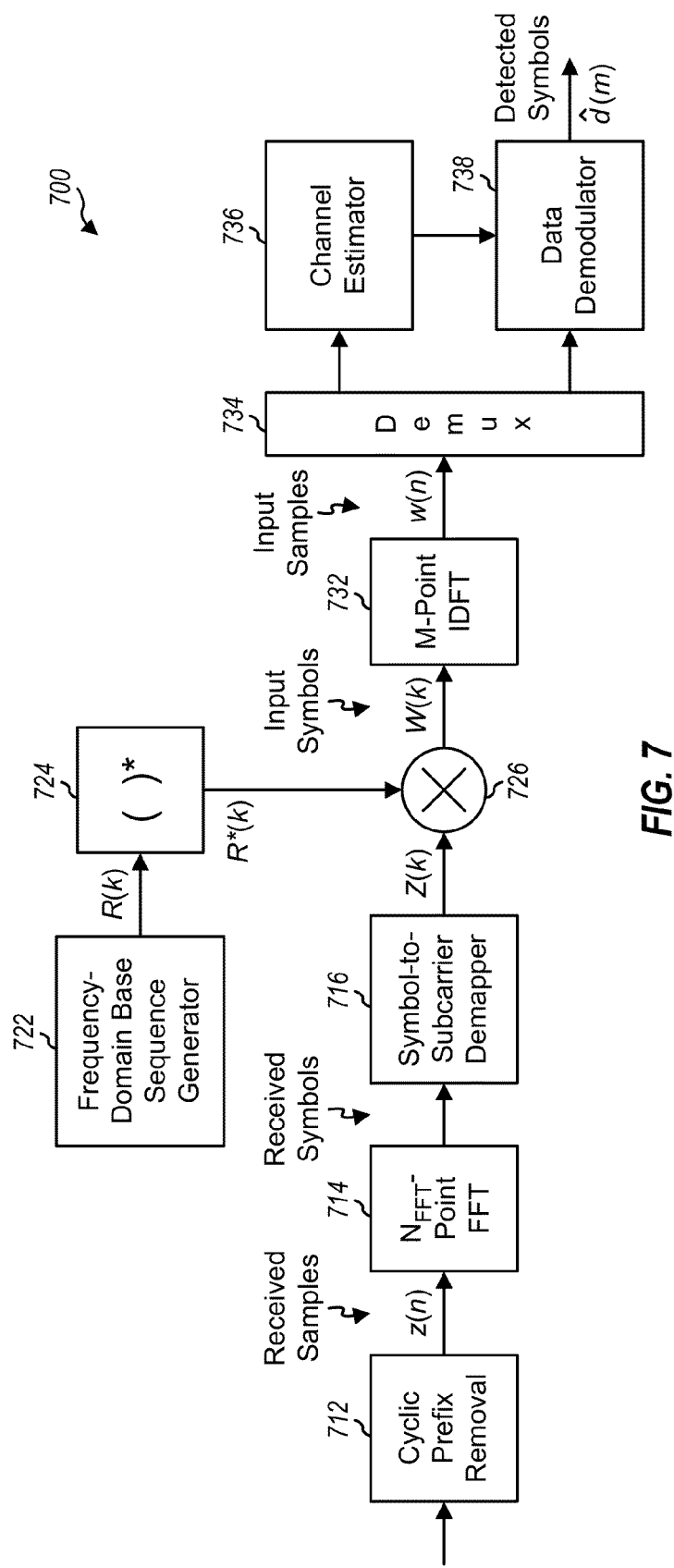
FIG. 7 shows a design of a receiver.

FIG. 7 shows a block diagram of a design of a receiver 700, which may be capable of receiving demodulation reference signal and data multiplexed on the same resources. Within receiver 500, a cyclic prefix removal unit 712 may obtains $N_{FFT}+N_{CP}$ received samples in one SC-FDMA symbol period, remove $N_{CP}$ received samples corresponding to the cyclic prefix, and provide $N_{FFT}$ received samples. A fast Fourier transform (FFT) unit 714 may perform an $N_{FFT}$-point FFT on the $N_{FFT}$ received samples and provide $N_{FFT}$ received symbols for the $N_{FFT}$ total subcarriers z(n). A symbol-to-subcarrier demapper 716 may provide M received symbols Z(k) from the M subcarriers used for transmission and may discard the remaining received symbols.

A base sequence generator 722 may generate a frequency-domain base sequence R(k) of length M. A unit 724 may provide the complex conjugate of each reference symbol in the base sequence R(k). A multiplier 726 may multiply each received symbol Z(k) with a corresponding complex-conjugated reference symbol R*(k) and provide a corresponding input symbol W(k). An IDFT unit 732 may perform an M-point IDFT on the M input symbols from multiplier 726 and provide M time-domain input samples w(n), for n=0, . . . , M−1. Each input sample w(n) may be indicative of the correlation result between the received samples and an orthogonal sequence of a particular cyclic shift n. Multiplier 726 and IDFT unit 732 may thus efficiently correlate the received samples against M orthogonal sequences of different cyclic shifts.

A demultiplexer 734 may provide input samples for each demodulation reference signal to a channel estimator 736 and may provide the remaining input samples to a data demodulator 738. If only one UE transmitted on the M subcarriers, e.g., as shown in FIG. 6A, then demultiplexer 734 may provide the first L input samples w(0) through w(L−1) to channel estimator 736 and may provide the remaining M-L input samples to data demodulator 738. L may be less than or equal to the size of a demodulation reference signal region and the following guard region. For the example shown in FIG. 6A, L may be less than or equal to 100. The first L input samples may correspond to L taps of a channel impulse response for a wireless channel from a UE to an eNB. Channel estimator 736 may derive a channel estimate based on the first L input samples. The channel estimate may be a time-domain channel impulse response estimate, a frequency-domain channel frequency response estimate, etc.

Data demodulator 738 may demodulate the remaining input samples based on the channel estimate and provide detected symbols d̂(m), which may be estimates of the data modulation symbols d(m) transmitted by the UE. Data demodulator 738 may perform equalization with the channel estimate to mitigate interchip interference between cyclic shifts within the data region.

If multiple UEs transmit on the M subcarriers, e.g., as shown in FIG. 6B or 6C, then demultiplexer 734 may provide input samples corresponding to each set of demodulation reference signal region and guard region to channel estimator 736 and may provide the remaining input samples to data demodulator 738. Channel estimator 736 may derive a channel estimate for each demodulation reference signal based on the input samples for that reference signal. Data demodulator 738 may demodulate the input samples corresponding to the data from each UE based on the channel estimate for that UE and may provide detected symbols for the UE.

FIG. 7 shows an exemplary design of a receiver that can recover demodulation reference signal and data sent on the same resources. Channel estimation and demodulation may also be performed in other manners.

The techniques described herein may allow demodulation reference signal to be multiplexed with data on the same resources. The resultant output samples may have higher peak-to-average-power ratio (PAPR) due to the multiplexing. For UEs with high uplink power headroom (e.g., UEs located close to an eNB and thus transmitting at relatively low power), it may not be necessary to maintain a single-carrier waveform, which may be obtained by transmitting only demodulation reference signal or only data in a given symbol period. It may be beneficial for these UEs to transmit data with demodulation reference signals. The techniques may be able to reduce the 14 to 17% overhead for the demodulation reference signal to close to zero in scenarios with low delay spread. For example, a UE may be able to transmit 1001 data modulation symbols in one SC-FDMA symbol with the multiplexing format shown in FIG. 6A.

The techniques described herein essentially divide the dimensions available in a symbol period in the code domain using different cyclic shifts of a base sequence as orthogonal sequences or spreading codes. The techniques described herein can maintain orthogonality between demodulation reference signal and data using the orthogonal sequences. The techniques can also support multiplexing of multiple UEs for SDMA and can maintain orthogonality between these UEs. With coordinated assignment, orthogonality may be maintained between UEs in neighboring cells.

Figure 8:
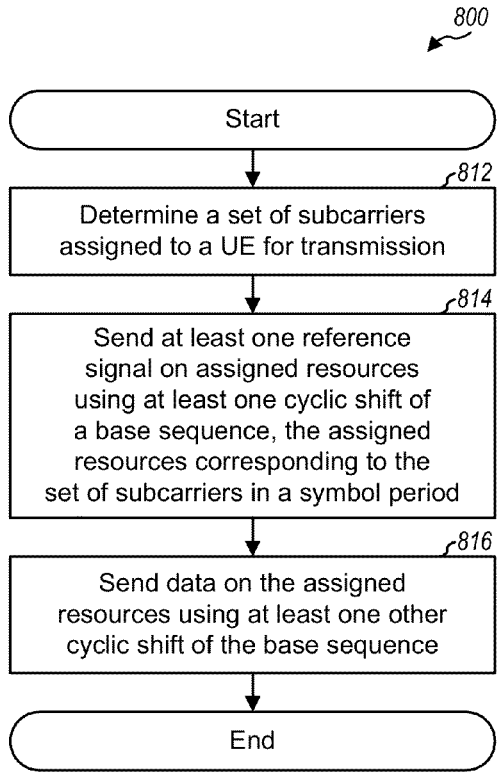
FIGS. 8 and 10 show a process and an apparatus, respectively, for sending reference signal and data.

FIG. 8 shows a design of a process 800 for sending reference signal and data in a wireless communication system. Process 800 may be performed by a UE (as described below) or by some other entity. The UE may determine a set of subcarriers assigned to the UE for transmission (block 812). The UE may send at least one reference signal on assigned resources using at least one cyclic shift of a base sequence (block 814). The assigned resources may correspond to the set of subcarriers in a symbol period. The base sequence may comprise a CAZAC sequence, such as a Zadoff-Chu sequence, or some other sequence. Each cyclic shift of the base station may correspond to a different orthogonal sequence, as described above. Each reference signal may be a demodulation reference signal used for data demodulation or some other signal. The UE may send data on the assigned resources using at least one other cyclic shift of the base sequence (block 816).

For block 814, the UE may send each reference signal using a different cyclic shift of the base sequence. For each reference signal, the UE may modulate a cyclic shift of the base sequence with a known modulation symbol (e.g., $g_{RS}$) for the reference signal. For block 816, the UE may modulate each cyclic shift of the base sequence used for data with a data modulation symbol. The UE may modulate the cyclic shifts in various manners.

Figure 9:
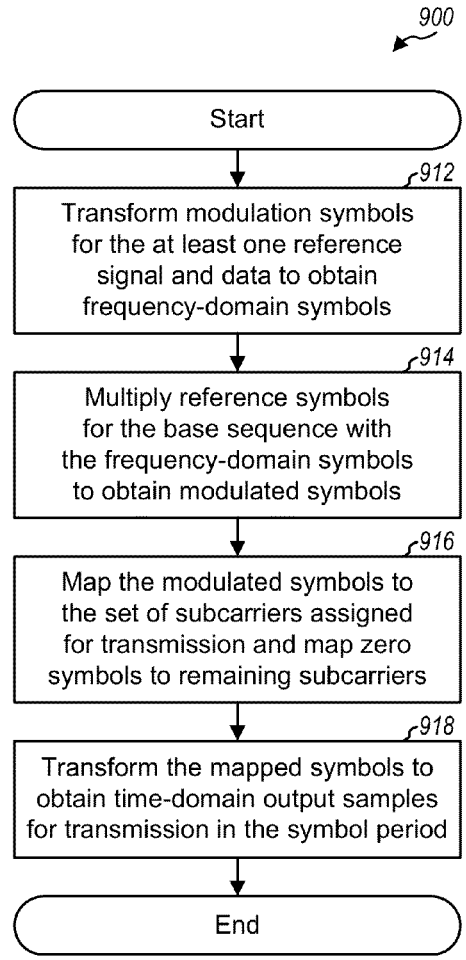
FIG. 9 shows a process for modulating cyclic shifts of a base sequence.

FIG. 9 shows a design of a process 900 for modulating cyclic shifts of the base sequence. Process 900 may be used for steps 814 and 816 in FIG. 8 and may be implemented as shown in FIG. 5. The UE may transform modulation symbols for the at least one reference signal and data to obtain frequency-domain symbols (block 912). The UE may multiply reference symbols for the base sequence with the frequency-domain symbols to obtain modulated symbols (block 914). The UE may map the modulated symbols to the set of subcarriers assigned for transmission and may map zero symbols to the remaining subcarriers (block 916). The UE may transform the mapped symbols to obtain time-domain output samples for transmission in the symbol period (block 918).

The UE may send reference signal(s) and data in various manners. In one design, the UE may send a single reference signal using a single cyclic shift of the base sequence, e.g., as shown in FIG. 6A. In another design, the UE may send multiple reference signals using multiple cyclic shifts of the base sequence, e.g., one reference signal for each transmit antenna at the UE. The UE may send multiple data modulation symbols using multiple cyclic shifts of the base sequence. In one design, the UE may apply higher gain for the at least one cyclic shift used for the at least one reference signal in order to obtain higher transmit power for each cyclic shift used for reference signal relative to each cyclic shift used for data.

In one design, the UE may determine a set of cyclic shifts assigned to the UE. The set of cyclic shifts may include a subset of all cyclic shifts available for the set of subcarriers assigned to the UE. For SDMA, the remaining available cyclic shifts may be assigned to at least one other UE. The UE may determine the at least one cyclic shift for the at least one reference signal and the at least one other cyclic shift for data from the set of cyclic shifts assigned to the UE.

In one design, the at least one cyclic shift for the at least one reference signal may be separated from the at least one other cyclic shift for data by at least one guard region, e.g., as shown in FIGS. 6A to 6C. Each guard region may include one or more cyclic shifts. If the UE sends multiple reference signals, then the cyclic shifts for the multiple reference signals may be separated from each other by one or more cyclic shifts.

In one design, the UE may receive signaling indicating the at least one cyclic shift to use for the at least one reference signal and/or the at least one other cyclic shift to use for data. The signaling may indicate a multiplexing format to use, the size of each region in the multiplexing format, etc. Alternatively, the signaling may convey an index of a selected multiplexing configuration among all supported multiplexing configurations.

Figure 10:
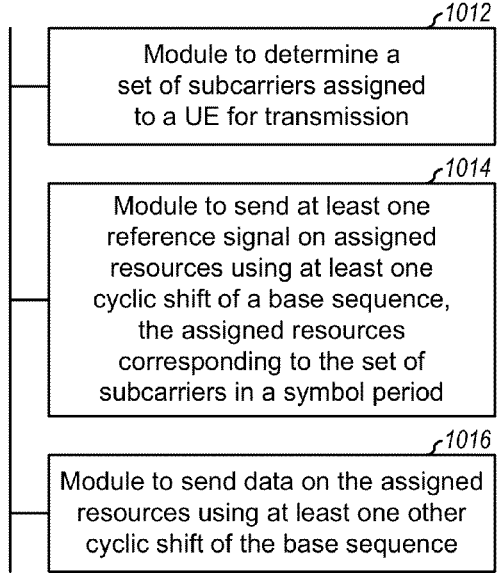

FIG. 10 shows a design of an apparatus 1000 for sending reference signal and data in a wireless communication system. Apparatus 1000 includes a module 1012 to determine a set of subcarriers assigned to a UE for transmission, a module 1014 to send at least one reference signal on assigned resources using at least one cyclic shift of a base sequence, with the assigned resources corresponding to the set of subcarriers in a symbol period, and a module 1016 to send data on the assigned resources using at least one other cyclic shift of the base sequence.

FIG. 11 shows a design of a process 1100 for receiving reference signal and data in a wireless communication system. Process 1100 may be performed by a base station/eNB (as described below) or by some other entity. The eNB may determine a set of subcarriers assigned to a UE for transmission (block 1112). The eNB may receive at least one reference signal sent by the UE on assigned resources using at least one cyclic shift of a base sequence (block 1114). The assigned resources may correspond to the set of subcarriers in a symbol period. The eNB may receive data sent by the UE on the assigned resources using at least one other cyclic shift of the base sequence (block 1116). The eNB may perform demodulation for the reference signal and data in various manners.

FIG. 12 shows a design of a process 1200 for demodulating cyclic shifts of the base sequence. Process 1200 may be implemented as shown in FIG. 7. The eNB may transform received samples in the symbol period to the frequency domain to obtain received symbols (block 1212). The eNB may extract received symbols for the set of subcarriers assigned to the UE and may discard the remaining received symbols (block 1214). The eNB may multiply the extracted symbols with symbols derived from the base sequence to obtain input symbols (block 1216). The eNB may then transform the input symbols to time domain to obtain input samples (block 1218). The eNB may derive a channel estimate based on a first subset of the input samples (block 1220). The eNB may perform data demodulation on a second subset of the input samples with the channel estimate to obtain detected symbols for the data sent by the UE (block 1222).

In one design, the eNB may receive a single reference signal sent by the UE using a single cyclic shift of the base sequence. In another design, the eNB may receive multiple reference signals sent by the UE using multiple cyclic shifts of the base sequence, e.g., one reference signal for each transmit antenna at the UE. Each reference signal may be sent using a different cyclic shift of the base sequence. The eNB may derive a channel estimate for each transmit antenna at the UE based on the reference signal sent from that transmit antenna. For both designs, the eNB may receive multiple data modulation symbols sent by the UE using multiple cyclic shifts of the base sequence.

For SDMA, the eNB may determine a first set of cyclic shifts assigned to the UE and may determine a second set of cyclic shifts assigned to a second UE. Both UEs may be assigned the same set of subcarriers. The first and second sets of cyclic shifts may comprise different subsets of all cyclic shifts available for the assigned set of subcarriers. The eNB may receive the at least one reference signal and data sent by the UE using the first set of cyclic shifts. The eNB may receive at least one reference signal and possibly data sent by the second UE using the second set of cyclic shifts. The eNB may also multiplex more than two UEs on the set of subcarriers.

The eNB may send signaling indicating the at least one cyclic shift to use for the at least one reference signal and/or the at least one other cyclic shift to use for data to the UE. The signaling may convey pertinent information in various manners, as described above.

FIG. 13 shows a design of an apparatus 1300 for receiving reference signal and data in a wireless communication system. Apparatus 1300 includes a module 1312 to determine a set of subcarriers assigned to a UE for transmission, a module 1314 to receive at least one reference signal sent by the UE on assigned resources using at least one cyclic shift of a base sequence, the assigned resources corresponding to the set of subcarriers in a symbol period, and a module 1316 to receive data sent by the UE on the assigned resources using at least one other cyclic shift of the base sequence.

The modules in FIGS. 10 and 13 may comprise processors, electronics devices, hardware devices, electronics components, logical circuits, memories, software codes, firmware codes, etc., or any combination thereof.

Figure 14:
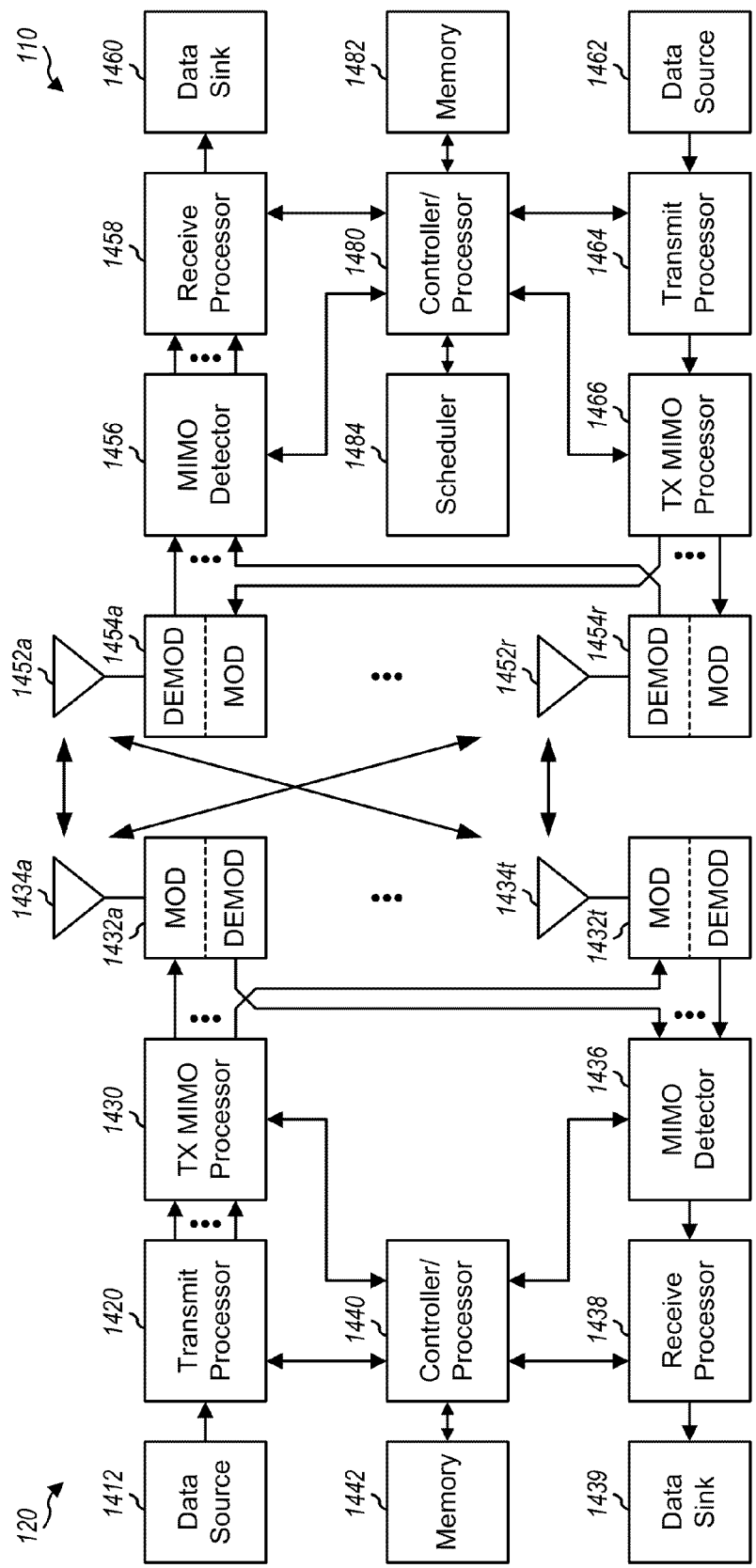
FIG. 14 shows a block diagram of a base station and a UE.

FIG. 14 shows a block diagram of a design of a base station/eNB 110 and a UE 120, which may be one of the eNBs and one of the UEs in FIG. 1. UE 120 may be equipped with T antennas 1434a through 1434t, and eNB 110 may be equipped with R antennas 1452a through 1452r, where in general T≥1 and R≥1.

At UE 120, a transmit processor 1420 may receive traffic data from a data source 1412, process (e.g., encode, interleave, and modulate) the traffic data based on one or more modulation and coding schemes, and provide modulation symbols for traffic data. Transmit processor 1420 may also process control data from a controller/processor 1440 and provide modulation symbols for control data. Transmit processor 1420 may generate a base sequence and modulate different cyclic shifts of the base sequence with known and/or data modulation symbols, e.g., as shown in FIG. 4 or 5. A transmit (TX) MIMO processor 1430 may perform spatial processing (e.g., precoding) on the symbols from transmit processor 1420, if applicable, and provide T output symbol streams to T modulators (MODs) 1432a through 1432t. Each modulator 1432 may process a respective output symbol stream (e.g., for SC-FDMA) to obtain an output sample stream. Each modulator 1432 may further process (e.g., convert to analog, amplify, filter, and upconvert) the output sample stream to obtain an uplink signal. T uplink signals from modulators 1432a through 1432t may be transmitted via T antennas 1434a through 1434t, respectively.

At eNB 110, antennas 1452a through 1452r may receive the uplink signals from UE 120 and provide received signals to demodulators (DEMODs) 1454a through 1454r, respectively. Each demodulator 1454 may condition (e.g., filter, amplify, downconvert, and digitize) a respective received signal to obtain received samples. Each demodulator 1454 may further process the received samples to obtain input symbols. For example, each demodulator 1454 may demodulate different cyclic shifts of the base sequence, e.g., as shown in FIG. 7. A MIMO detector 1456 may obtain input symbols from all R demodulators 1454a through 1454r, perform MIMO detection on the input symbols if applicable, and provide detected symbols. A receive processor 1458 may process (e.g., demodulate, deinterleave, and decode) the detected symbols, provide decoded traffic data to a data sink 1460, and provide decoded control data to a controller/processor 1480.

On the downlink, at eNB 110, traffic data from a data source 1462 and control data (e.g., resource assignments) from controller/processor 1480 may be processed by a transmit processor 1464, precoded by a TX MIMO processor 1466 if applicable, conditioned by modulators 1454a through 1454r, and transmitted to UE 120. At UE 120, the downlink signals from eNB 110 may be received by antennas 1434, conditioned by demodulators 1432, processed by a MIMO detector 1436 if applicable, and further processed by a receive processor 1438 to obtain the traffic data and control data sent to UE 120.

Controllers/processors 1440 and 1480 may direct the operation at UE 120 and eNB 110, respectively. Processor 1420 and/or other processors and modules at UE 120 may perform or direct process 800 in FIG. 8, process 900 in FIG. 9, and/or other processes for the techniques described herein. Demodulators 1454, processor 1458, and/or other processors and modules at eNB 110 may perform or direct process 1100 in FIG. 11, process 1200 in FIG. 12, and/or other processes for the techniques described herein. Memories 1442 and 1482 may store data and program codes for UE 120 and eNB 110, respectively. A scheduler 1484 may schedule UEs for downlink and/or uplink transmission and may provide allocations of resources (e.g., subcarriers, cyclic shifts, etc.) for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, operation on a user equipment (UE), for wireless communication, comprising:
    sending at least one reference signal on a set of subcarriers in a symbol period using at least one cyclic shift of a base sequence; and
    sending data on the set of subcarriers in the symbol period using at least one other cyclic shift of the base sequence.

2. The method of claim 1, further comprising:
    determining the set of subcarriers assigned to the UE for transmission.

3. The method of claim 2, wherein the sending the at least one reference signal and the sending the data comprise:
    transforming modulation symbols for the at least one reference signal and the data to obtain frequency-domain symbols;
    multiplying reference symbols for the base sequence with the frequency-domain symbols to obtain modulated symbols;
    mapping the modulated symbols to the set of subcarriers in the symbol period; and transforming the mapped symbols to obtain time-domain output samples for transmission in the symbol period.

4. The method of claim 1, wherein the sending the at least one reference signal comprises modulating each of the at least one cyclic shift of the base sequence with a known modulation symbol for a reference signal, and wherein the sending the data comprises modulating each of the at least one other cyclic shift of the base sequence with a data modulation symbol.

5. The method of claim 1, wherein the sending the at least one reference signal comprises sending a single reference signal using a single cyclic shift of the base sequence, and wherein the sending the data comprises sending multiple data modulation symbols using multiple cyclic shifts of the base sequence.

6. The method of claim 1, wherein the sending the at least one reference signal comprises sending multiple reference signals using multiple cyclic shifts of the base sequence, one reference signal for each transmit antenna, each reference signal being sent using a different cyclic shift of the base sequence.

7. The method of claim 2, further comprising:
determining a set of cyclic shifts assigned to the UE, the set of cyclic shifts including a subset of all cyclic shifts available for the set of subcarriers in the symbol period, wherein at least a subset of remaining available cyclic shifts is assigned to at least one other UE; and
determining the at least one cyclic shift for the at least one reference signal and the at least one other cyclic shift for the data from the set of cyclic shifts assigned to the UE.

8. The method of claim 1, wherein the at least one cyclic shift for the at least one reference signal is separated from the at least one other cyclic shift for the data by at least one guard region, each guard region including one or more cyclic shifts.

9. The method of claim 6, wherein the multiple cyclic shifts for the multiple reference signals are separated from each other by one or more cyclic shifts.

10. The method of claim 1, further comprising:
applying higher gain for the at least one cyclic shift used for the at least one reference signal to obtain higher transmit power for each cyclic shift used for a reference signal relative to each cyclic shift used for data.

11. The method of claim 1, further comprising:
receiving signaling indicating the at least one cyclic shift to use for the at least one reference signal, or the at least one other cyclic shift to use for the data, or both.

12. The method of claim 1, wherein the base sequence comprises a CAZAC (constant amplitude zero auto correlation) sequence.

13. The method of claim 1, wherein the base sequence comprises a Zadoff-Chu sequence.

14. An apparatus for wireless communication, comprising:
means for sending at least one reference signal on a set of subcarriers in a symbol period using at least one cyclic shift of a base sequence; and
means for sending data on the set of subcarriers in the symbol using at least one other cyclic shift of the base sequence.

15. The apparatus of claim 14, wherein the means for sending the at least one reference signal and the means for sending the data comprise:
means for transforming modulation symbols for the at least one reference signal and the data to obtain frequency-domain symbols;
means for multiplying reference symbols for the base sequence with the frequency-domain symbols to obtain modulated symbols;
means for mapping the modulated symbols to the set of subcarriers in the symbol period; and
means for transforming the mapped symbols to obtain time-domain output samples for transmission in the symbol period.

16. The apparatus of claim 14, wherein the means for sending the at least one reference signal comprises means for modulating each of the at least one cyclic shift of the base sequence with a known modulation symbol for a reference signal, and wherein the means for sending the data comprises means for modulating each of the at least one other cyclic shift of the base sequence with a data modulation symbol.

17. The apparatus of claim 14, wherein the means for sending the at least one reference signal comprises means for sending a single reference signal using a single cyclic shift of the base sequence, and wherein the means for sending the data comprises means for sending multiple data modulation symbols using multiple cyclic shifts of the base sequence.

18. The apparatus of claim 14, wherein the means for sending the at least one reference signal comprises means for sending multiple reference signals using multiple cyclic shifts of the base sequence, one reference signal for each transmit antenna, each reference signal being sent using a different cyclic shift of the base sequence.

19. The apparatus of claim 14, further comprising:
means for determining the set of subcarriers assigned to the apparatus for transmission;
means for determining a set of cyclic shifts assigned to the apparatus, the set of cyclic shifts including a subset of all cyclic shifts available for the set of subcarriers in the symbol period, wherein at least a subset of remaining available cyclic shifts is assigned to at least one other apparatus; and
means for determining the at least one cyclic shift for the at least one reference signal and the at least one other cyclic shift for the data from the set of cyclic shifts assigned to the apparatus.

20. An apparatus for wireless communication, comprising:
at least one processor configured to send at least one reference signal on a set of subcarriers in a symbol period using at least one cyclic shift of a base sequence, and to send data on the set of subcarriers in the symbol period using at least one other cyclic shift of the base sequence.

21. The apparatus of claim 20, wherein the at least one processor is configured to transform modulation symbols for the at least one reference signal and the data to obtain frequency-domain symbols, to multiply reference symbols for the base sequence with the frequency-domain symbols to obtain modulated symbols, to map the modulated symbols to the set of subcarriers in the symbol period, and to transform the mapped symbols to obtain time-domain output samples for transmission in the symbol period.

22. The apparatus of claim 20, wherein the at least one processor is configured to modulate each of the at least one cyclic shift of the base sequence with a known modulation symbol for a reference signal, and to modulate each of the at least one other cyclic shift of the base sequence with a data modulation symbol.

23. The apparatus of claim 20, wherein the at least one processor is configured to send a single reference signal using a single cyclic shift of the base sequence, and to send multiple data modulation symbols using multiple cyclic shifts of the base sequence.

24. The apparatus of claim 20, wherein the at least one processor is configured to send multiple reference signals using multiple cyclic shifts of the base sequence, one reference signal for each transmit antenna, each reference signal being sent using a different cyclic shift of the base sequence.

25. The apparatus of claim 20, wherein the at least one processor is configured to determine the set of subcarriers in the symbol period assigned to the apparatus for transmission to determine a set of cyclic shifts assigned to the apparatus, the set of cyclic shifts including a subset of all cyclic shifts available for the set of subcarriers in the symbol period, wherein at least a subset of remaining available cyclic shifts is assigned to at least one other apparatus, and to determine the at least one cyclic shift for the at least one reference signal and the at least one other cyclic shift for the data from the set of cyclic shifts assigned to the apparatus.

26. A computer program product, comprising:
a non-transitory computer-readable storage medium comprising:
code for causing at least one computer to send at least one reference signal on a set of subcarriers in a symbol period using at least one cyclic shift of a base sequence; and
code for causing the at least one computer to send data on the set of subcarriers in the symbol period using at least one other cyclic shift of the base sequence.

27. A method, operational on a base station, for wireless communication, comprising:
receiving at least one reference signal sent by a user equipment (UE) on a set of subcarriers in a symbol period using at least one cyclic shift of a base sequence; and
receiving data sent by the UE on the set of subcarriers in the symbol period using at least one other cyclic shift of the base sequence.

28. The method of claim 27, further comprising:
determining the set of subcarriers assigned to the UE for transmission.

29. The method of claim 28, wherein the receiving the at least one reference signal and the receiving the data comprise:
transforming received samples in the symbol period to frequency domain to obtain received symbols;
extracting received symbols for the set of subcarriers in the symbol period;
multiplying the extracted symbols with symbols derived from the base sequence to obtain input symbols;
transforming the input symbols to time domain to obtain input samples;
deriving a channel estimate based on a first subset of the input samples; and
performing data demodulation on a second subset of the input samples with the channel estimate to obtain detected symbols for the data sent by the UE.

30. The method of claim 27, wherein the receiving the at least one reference signal comprises receiving a single reference signal sent by the UE using a single cyclic shift of the base sequence, and wherein the receiving the data comprises receiving multiple data modulation symbols sent by the UE using multiple cyclic shifts of the base sequence.

31. The method of claim 27, wherein the receiving the at least one reference signal comprises receiving multiple reference signals sent by the UE using multiple cyclic shifts of the base sequence, one reference signal for each transmit antenna at the UE, each reference signal being sent using a different cyclic shift of the base sequence, the method further comprising:
deriving a channel estimate for each transmit antenna at the UE based on the reference signal sent from the transmit antenna.

32. The method of claim 28, further comprising:
determining a first set of cyclic shifts assigned to the UE;
determining a second set of cyclic shifts assigned to a second UE, the UE and the second UE being both assigned the set of subcarriers in the symbol period, the first and second sets comprising different subsets of all cyclic shifts available for the assigned set of subcarriers in the symbol period;
receiving the at least one reference signal and the data sent by the UE using the first set of cyclic shifts; and
receiving only at least one reference signal or both at least one reference signal and data sent by the second UE using the second set of cyclic shifts.

33. The method of claim 27, further comprising:
sending signaling indicating the at least one cyclic shift to use for the at least one reference signal, or the at least one other cyclic shift to use for the data, or both to the UE.

34. An apparatus for wireless communication, comprising:
means for receiving at least one reference signal sent by a user equipment (UE) on a set of subcarriers in a symbol period using at least one cyclic shift of a base sequence; and
means for receiving data sent by the UE on the set of subcarriers in the symbol period using at least one other cyclic shift of the base sequence.

35. The apparatus of claim 34, wherein the means for receiving the at least one reference signal and the means for receiving the data comprise:
means for transforming received samples in the symbol period to frequency domain to obtain received symbols;
means for extracting received symbols for the set of subcarriers in the symbol period assigned to the UE for transmission;
means for multiplying the extracted symbols with symbols derived from the base sequence to obtain input symbols;
means for transforming the input symbols to time domain to obtain input samples;
means for deriving a channel estimate based on a first subset of the input samples; and
means for performing data demodulation on a second subset of the input samples with the channel estimate to obtain detected symbols for the data sent by the UE.

36. The apparatus of claim 34, wherein the means for receiving the at least one reference signal comprises means for receiving a single reference signal sent by the UE using a single cyclic shift of the base sequence, and wherein the means for receiving the data comprises means for receiving multiple data modulation symbols sent by the UE using multiple cyclic shifts of the base sequence.

37. The apparatus of claim 34, wherein the means for receiving the at least one reference signal comprises means for receiving multiple reference signals sent by the UE using multiple cyclic shifts of the base sequence, one reference signal for each transmit antenna at the UE, each reference signal being sent using a different cyclic shift of the base sequence, the apparatus further comprising:
means for deriving a channel estimate for each transmit antenna at the UE based on the reference signal sent from the transmit antenna.

38. The apparatus of claim 34, further comprising:
means for determining the set of subcarriers in the symbol period assigned to the UE for transmission;
means for determining a first set of cyclic shifts assigned to the UE;
means for determining a second set of cyclic shifts assigned to a second UE, the UE and the second UE being both assigned the set of subcarriers in the symbol period, the first and second sets comprising different subsets of all cyclic shifts available for the assigned set of subcarriers in the symbol period;

means for receiving the at least one reference signal and the data sent by the UE using the first set of cyclic shifts; and means for receiving only at least one reference signal or at least one reference signal and data sent by the second UE using the second set of cyclic shifts.

39. An apparatus for wireless communication, comprising:

at least one processor configured to receive at least one reference signal sent by a user equipment (UE) on a set of subcarriers in a symbol period using at least one cyclic shift of a base sequence; and to receive data sent by the UE on the set of subcarriers in the symbol period using at least one other cyclic shift of the base sequence.

40. The apparatus of claim 39, wherein the at least one processor is further configured to:

transform received samples in the symbol period to frequency domain to obtain received symbols;

extract received symbols for the set of subcarriers in the symbol period assigned for transmission;

multiply the extracted symbols with symbols derived from the base sequence to obtain input symbols;

transform the input symbols to time domain to obtain input samples;

derive a channel estimate based on a first subset of the input samples; and perform data demodulation on a second subset of the input samples with the channel estimate to obtain detected symbols for the data sent by the UE.

41. The apparatus of claim 39, wherein the at least one processor is further configured to receive a single reference signal sent by the UE using a single cyclic shift of the base sequence, and to receive multiple data modulation symbols sent by the UE using multiple cyclic shifts of the base sequence.

42. The apparatus of claim 39, wherein the at least one processor is further configured to receive multiple reference signals sent by the UE using multiple cyclic shifts of the base sequence, wherein one reference signal for each transmit antenna at the UE, each reference signal being sent using a different cyclic shift of the base sequence; and to derive a channel estimate for each transmit antenna at the UE based on the reference signal sent from the transmit antenna.

43. The apparatus of claim 39, wherein the at least one processor is further configured to:

determine a first set of cyclic shifts assigned to the UE;

determine a second set of cyclic shifts assigned to a second UE, the UE and the second UE being both assigned the set of subcarriers in the symbol period, the first and second sets comprising different subsets of all cyclic shifts available for the assigned set of subcarriers in the symbol period;

receive the at least one reference signal and the data sent by the UE using the first set of cyclic shifts; and receive only at least one reference signal or both at least one reference signal and data sent by the second UE using the second set of cyclic shifts.

44. The apparatus of claim 39, wherein the at least one processor is further configured to send signaling indicating the at least one cyclic shift to use for the at least one reference signal, or the at least one other cyclic shift to use for the data, or both to the UE.

45. A computer program product, comprising:

a non-transitory computer-readable storage medium comprising:

code for causing at least one computer to receive at least one reference signal sent by a user equipment (UE) on a set of subcarriers in a symbol period using at least one cyclic shift of a base sequence; and code for causing at least one computer to receive data sent by the UE on the set of subcarriers in the symbol period using at least one other cyclic shift of the base sequence.

* * * * *